(12) United States Patent
Vetter et al.

(10) Patent No.: US 10,293,928 B2
(45) Date of Patent: May 21, 2019

(54) DEVICES AND METHODS FOR IN FLIGHT TRANSITION VTOL/FIXED WING HYBRID AIRCRAFT STRUCTURES AND FLIGHT MODES

(71) Applicants: Eugene H Vetter, Portola Valley, CA (US); James W Vetter, Portola Valley, CA (US); Paul A Vetter, Portola Valley, CA (US)

(72) Inventors: Eugene H Vetter, Portola Valley, CA (US); James W Vetter, Portola Valley, CA (US); Paul A Vetter, Portola Valley, CA (US)

(*) Notice: Subject to any disclaimer, the term of this patent is extended or adjusted under 35 U.S.C. 154(b) by 0 days.

(21) Appl. No.: 15/863,884

(22) Filed: Jan. 6, 2018

(65) Prior Publication Data

US 2018/0215464 A1 Aug. 2, 2018

Related U.S. Application Data

(63) Continuation of application No. 14/723,720, filed on May 28, 2015, now Pat. No. 9,896,197.

(51) Int. Cl.
*B64C 27/30* (2006.01)
*B64C 27/10* (2006.01)
*B64C 27/24* (2006.01)
*B64C 27/26* (2006.01)

(52) U.S. Cl.
CPC ............. *B64C 27/30* (2013.01); *B64C 27/10* (2013.01); *B64C 27/24* (2013.01); *B64C 27/26* (2013.01)

(58) Field of Classification Search
CPC .... B64C 29/0025; B64C 27/605; B64C 27/30
See application file for complete search history.

(56) References Cited

U.S. PATENT DOCUMENTS

| | | | | |
|---|---|---|---|---|
| 3,288,225 A | * | 11/1966 | Flint | B64C 27/20 416/143 |
| 3,986,686 A | * | 10/1976 | Girard | B64C 27/24 244/7 A |
| 5,405,104 A | * | 4/1995 | Pande | B64C 27/24 244/17.25 |
| 6,234,422 B1 | * | 5/2001 | Bolonkin | B64C 27/026 244/17.11 |
| 6,471,158 B1 | * | 10/2002 | Davis | B64C 27/02 244/8 |
| 6,622,962 B1 | * | 9/2003 | White | B64C 27/26 244/12.3 |
| 6,669,137 B1 | * | 12/2003 | Chen | B64C 3/40 244/7 R |
| 7,118,340 B2 | * | 10/2006 | D'Anna | B64C 27/10 416/1 |
| 7,918,415 B2 | * | 4/2011 | de la Cierva Hoces | B64C 27/26 244/7 R |
| 8,089,034 B2 | * | 1/2012 | Hammerquist | B64C 3/56 244/3.27 |

(Continued)

*Primary Examiner* — Philip J Bonzell
*Assistant Examiner* — Michael B. Kreiner
(74) *Attorney, Agent, or Firm* — Young Law Firm, P.C.

(57) ABSTRACT

A hybrid VTOL/high speed aircraft may comprise systems and functions for in flight configuration changes from high lift helicopter or VTOL mode to fixed or swing-wing high speed aircraft mode to accommodate a variety of functions or missions.

7 Claims, 13 Drawing Sheets

(56) References Cited

U.S. PATENT DOCUMENTS

| | | | | |
|---|---|---|---|---|
| 8,167,233 B2* | 5/2012 | Brody | ............... | B64C 27/10 |
| | | | | 244/17.21 |
| 8,376,264 B1* | 2/2013 | Hong | ............... | B64C 27/26 |
| | | | | 244/17.23 |
| 9,702,254 B2* | 7/2017 | Saiz | ............... | B64C 27/26 |
| 9,889,928 B2* | 2/2018 | Salz | ............... | B64C 27/26 |
| 10,167,079 B2* | 1/2019 | Weiner | ............... | B64C 27/10 |
| 2012/0280091 A1* | 11/2012 | Saiz | ............... | B64C 27/26 |
| | | | | 244/7 R |
| 2014/0084114 A1* | 3/2014 | Valentin | ............... | B64C 27/30 |
| | | | | 244/7 R |
| 2014/0312177 A1* | 10/2014 | Gaonjur | ............... | B64C 27/24 |
| | | | | 244/7 A |

* cited by examiner

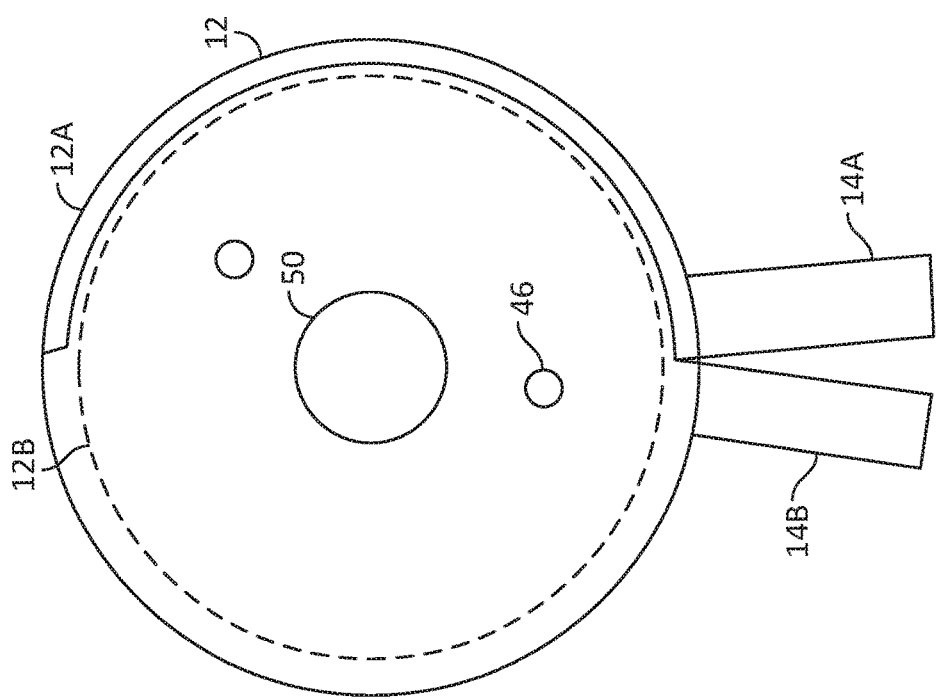

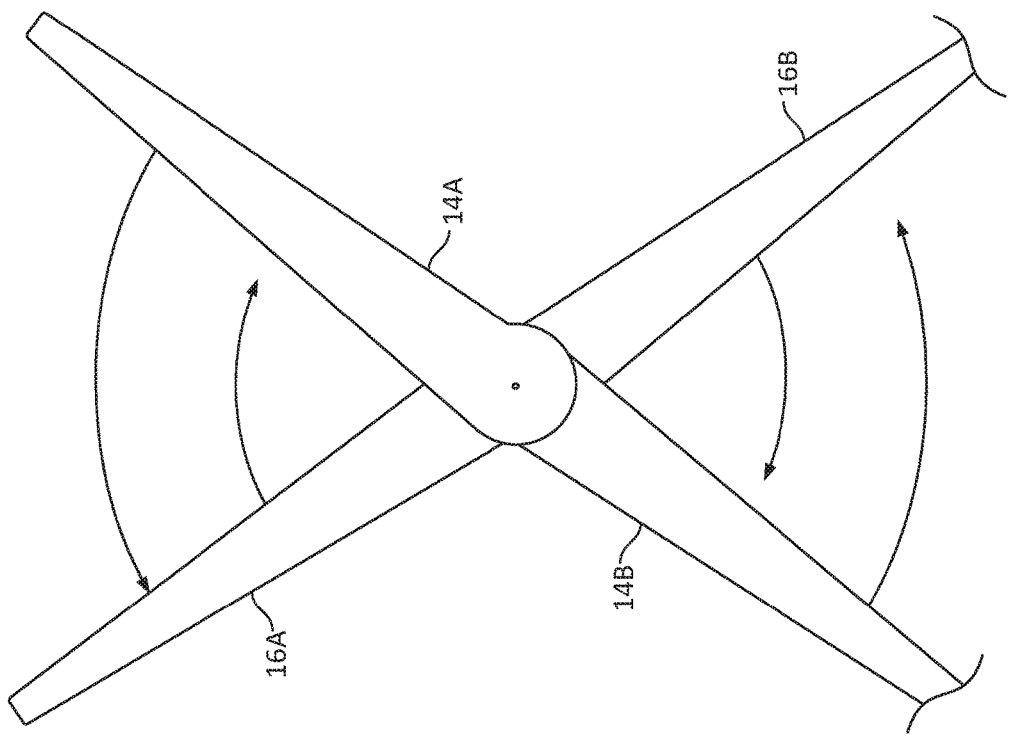

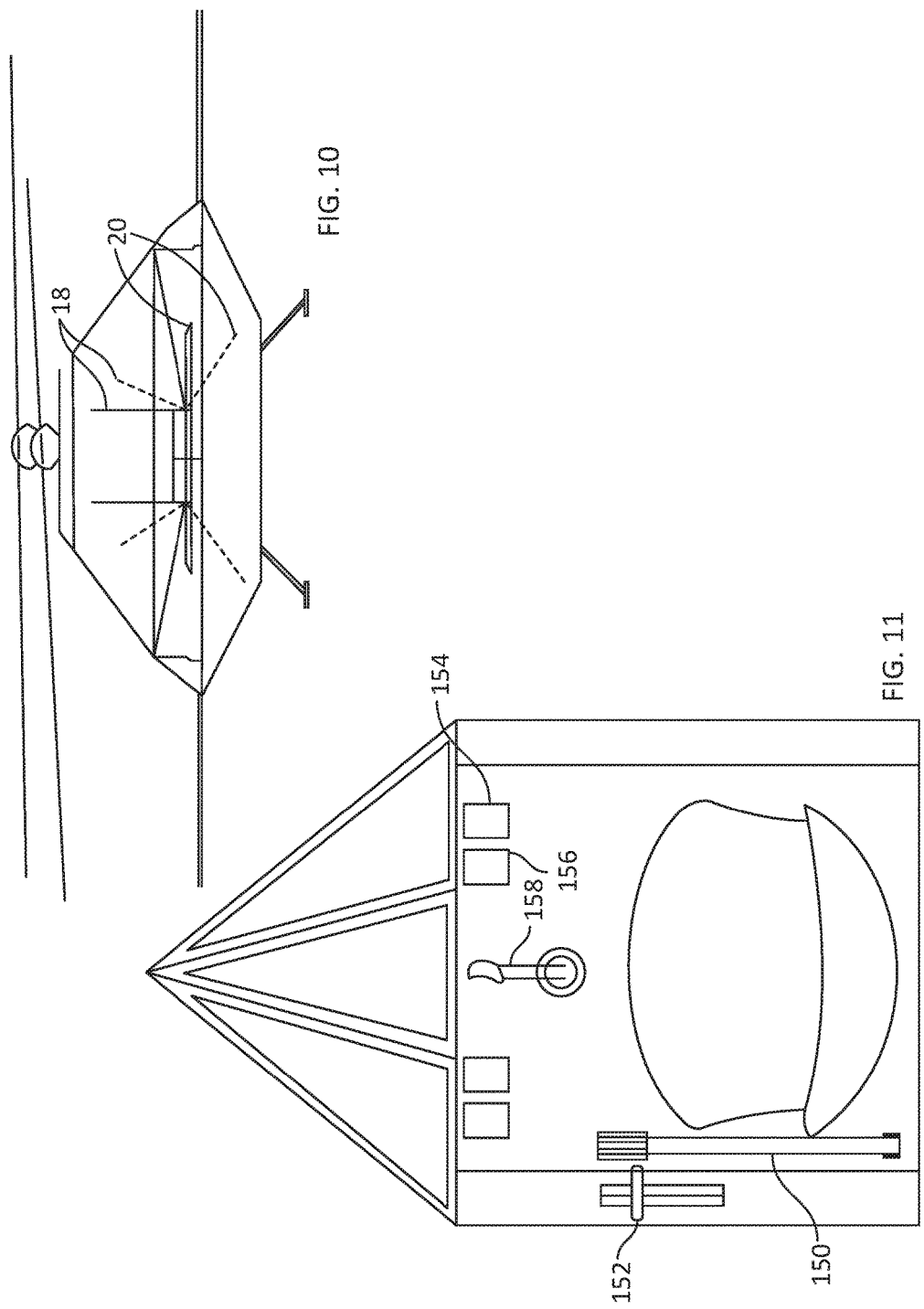

DEVICES AND METHODS FOR IN FLIGHT TRANSITION VTOL/FIXED WING HYBRID AIRCRAFT STRUCTURES AND FLIGHT MODES

FIELD OF THE INVENTION

Embodiments relate to hybrid VTOL (helicopter)/Fixed or Swing Wing Aircraft devices and corresponding methods. More particularly, embodiments relate to hybrid aircraft that combine and transition in flight from and to a low speed/high lift vertical takeoff or landing (VTOL) helicopter configuration to a high speed/low drag fixed or swing wing jet or propeller driven aircraft configuration in order to take advantage of the characteristics of each configuration in a single craft for different mission phases of flight. Embodiments may be configured for manned or unmanned (drone) applications, and may also be configured for heavy lift/medium to high speed transport or light lift/high speed functions or any combination of these configurations. Other embodiments may relate to methods and devices for helicopter configurations of single or coaxial counter-rotating rotor blade sets as the VTOL component of such hybrid aircraft.

BRIEF DESCRIPTION OF THE DRAWINGS

FIGS. 2A, 2B, and 2C illustrate various views of a twin rotor blade set and rotor hub, according to one embodiment;

FIG. 3B is a top view of a two pair of coaxial counter-rotating blade sets, according to embodiments;

FIG. 10 is a rear perspective view of the empennage of a hybrid aircraft, according to one embodiment;

FIG. 11 is a top perspective view of cockpit controls and layout of a hybrid aircraft, according to one embodiment.

DETAILED DESCRIPTION

Figure 1:
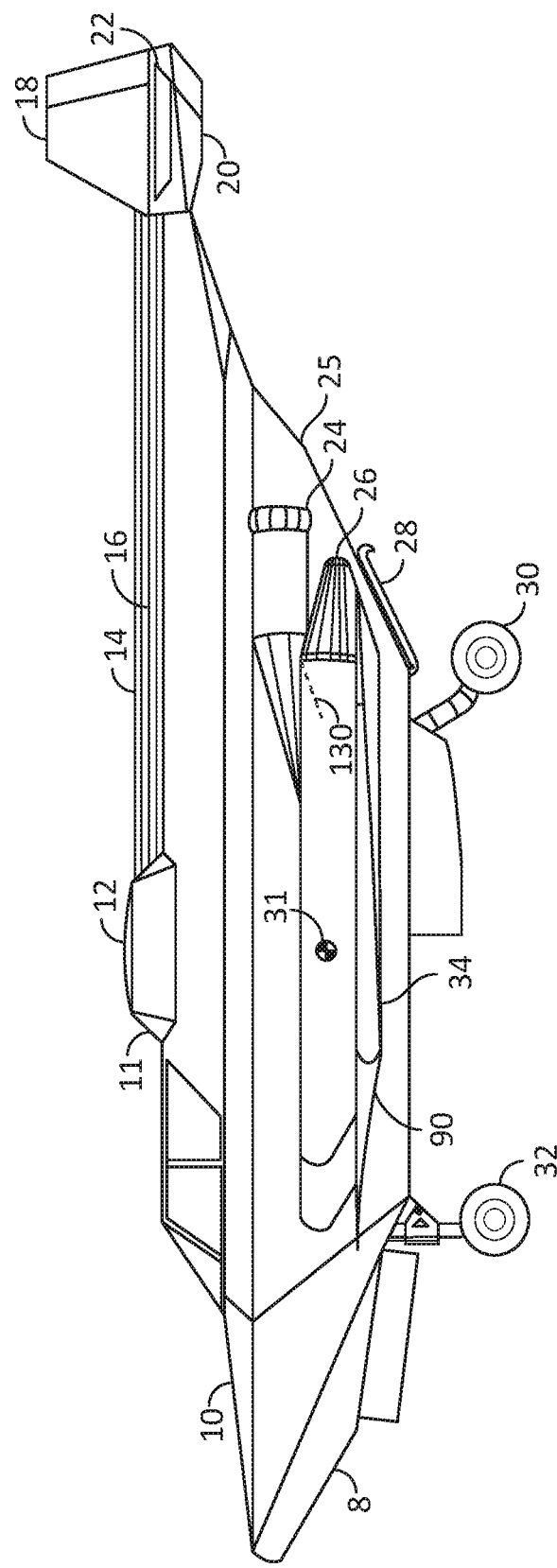
FIG. 1 is a side view of a hybrid aircraft, according to one embodiment.

Reference will now be made in detail to the construction and operation of embodiments illustrated in the accompanying drawings. The following description is only exemplary of the embodiments described and shown herein. The embodiments, therefore, are not limited to these implementations, but may be realized by other implementations.

Embodiments are drawn to high lift (VTOL)/high speed hybrid aircraft devices and methods that combine the capabilities of a helicopter with those of fixed or swing wing aircraft. Embodiments may comprise methods, structures and functionality for composite or mixed control systems, single or coaxial counter-rotating rotor blade sets, fixed or swing wing aircraft structures, increased directional control options and sensitivity and in flight helicopter to fixed or swing wing configuration changes to allow for maximum mission efficiency. Embodiments may be electrically, mechanically, hydraulically and/or manually controlled, powered and operated, and may be operated as manned (direct control) or unmanned (remotely controlled) or both configurations platforms A hybrid aircraft device, according to embodiments herein, may be used to advantage to fulfill the roles of both an efficient VTOL aircraft and an efficient high speed aircraft during selected mission phases. According to embodiments, described herein are methods of changing in-flight configurations from one form of flight, such as VTOL, to another form of flight, such as high speed fixed or variable swing wing operations. Traditionally, the limiting factors for maximum speed, approximately 150 knots, of a conventional helicopter design include such concepts as numbers of rotor blades per set, rotor blade profile, aspect ratio, chord thickness, stiffness, tip speed, retreating blade stall factors, dissymmetry of lift, airflow reversal and dissymmetrical drag, as well as both profile and induced drag on the spinning rotor blade set(s). Indeed, Rotor blade design is often based on a compromise between lift efficiency in hovering or vertical flight and drag and propulsion factors in forward flight. Rotor tip speed for an advancing rotor blade may approach the speed of sound, at which point drag increases even more rapidly than as a cube function of rotor speed. Retreating blade speed through an air mass is directly related to forward speed of a conventional helicopter, and both stalling speed conditions and airflow reversal over the retreating rotor blade may result in extreme dissymmetry of lift and/or cause pitch changes in the aircraft, and are the major limiting factors on conventional helicopter speed. Even with coaxial, counter-rotating blade sets as the primary lift structure coupled with auxiliary thrust mechanisms, recently demonstrated to exceed 250 knots, the increasing drag on the twin rotor discs at higher speeds ultimately limits the maximum speed limit of such advanced aircraft. Moreover, vibration must be strictly controlled to maintain stable flight at such speeds.

Embodiments overcome these limitations through hybrid design factors as described herein, which thus allow in-flight configuration changes or modes for maximum efficiency in both VTOL operations and for forward flight speed. According to one embodiment, during forward high-speed flight, the rotor blade sets may be feathered to a stored position on the airframe, and are not relied upon to provide the lift. These feathered and stored rotor blade sets are, according to one embodiment, not necessary for the high-speed phase of flight and thus do not present the disadvantages associated with conventional helicopters, such as the limitations on speed. Moreover, according to embodiments described herein, the ability to change aircraft configurations during a flight profile from a VTOL configuration to a high speed fixed or swing wing configuration and vice versa presents advantages such as choice of takeoff or landing sites, fuel conservation, longer maximum flight distances or legs, quietness, increased safety factors and more flexibility of flight profiles for various missions.

Herein, the term "fixed wing" may be used to contrast a high speed conventional aircraft structure and mode of flight operations to that of a helicopter or VTOL flight mode, as is commonly used to distinguish between the two aircraft types. The term fixed wing as used for this hybrid aircraft, according to embodiments, encompasses embodiments in which fixed stub wings are permanently affixed to the fuselage, as well as embodiments in which the wings may be swing-wings. Such swing-wings may be active in different flight profiles, i.e., further extended for slow speed flight and swept or partially retracted for high speed flight, or completely stowed for helicopter or VTOL flight modes, to allow efficient downwash or air mass movement from the rotor discs. According to one embodiment, both the rotor blade sets and swing-wings of a hybrid aircraft as shown and described herein may be folded to allow storage in tight spaces such as on a flight deck or in a hangar, or for efficient transport by aircraft, carriers, rail systems or other means.

Reference will now be made in detail to the structure and operation of embodiments illustrated in the accompanying drawings. FIG. 1 shows a side view of a hybrid aircraft 10 having a generic fuselage 8 and coaxial, counter-rotating rotor blades 14 and 16 and folded swing-wings 34, according to one embodiment. This view also shows external features such as retractable landing gear 30 and 32, twin direct jet propulsion units 26 with alternate gated 130 power turbine modules 24, rear entry port 25, tail-hook 28, rear empennage including twin rudders 18 and horizontal stabilizers 20 and associated control surfaces, and "No Tail Rotor" (NOTAR) bleed air gas ports 22. At the top of the fuselage, a fairing 11 to streamline the stowed rotor hubs 12 (13 not shown in this view) in lowered position may also be noted. Such a fairing 11 may be movable vertically or otherwise to unmask the rotor blades 14, 16 when deploying them or for streamlining the fuselage frontal area when the rotor blades 14, 16 are folded and stowed. Although not shown in this view, a canard wing may be incorporated into the forward section of the fuselage to provide increased lift, stability and pitch control, according to another embodiment. A pair of leading edge root extensions (LERX) 90 may add additional lift in near stall conditions and provide additional structural stability and streamlining to the swing-wings 34.

According to other embodiments, the main direct propulsion single or twin jet unit(s) may be separate from additional single or twin jet rotor transmission power units. According to still other embodiments, either or both main or rotor engine units may be piston driven, and may be combined or separate in terms of propulsion purpose. In still other embodiments, a main fixed wing mode thrust may be accomplished by the use of piston engines, or turboprop engines with fixed pitch or constant speed, full feathering propeller(s), which may be counter-rotating. It is to be understood that any combination or configuration of any of the foregoing is to be considered as being within the scope of this disclosure, as will be apparent to one skilled in the art. The rotor blade sets 14 and 16 are shown folded and stowed along the long axis of the fuselage 8 in this low wing configuration. However, according to one embodiment, with the main fixed (swing) wings 34 in a high wing configuration, stowage of the partially folded rotor blades along or within the upper surface of such high wings may be envisioned.

According to embodiments, various fuselage profiles, rotor profiles, NOTAR or tail rotor, wing profiles and other features discussed herein may be incorporated into a hybrid aircraft, as one skilled in the art may envision. Element 31 represents an approximate center of gravity for the generic fuselage 8, as illustrated. Advantageously, the center of gravity for both VTOL and fixed wing flight configurations may be designed to fall within a narrow sphere within the fuselage. Although the center of gravity position as shown in this illustration is relatively low for a helicopter, the long arm pendulum effect increases stability of the aircraft in VTOL mode which may be advantageous in transitioning from one flight mode to another in flight, according to embodiments. The fuselage 8 may be of any morphology or dimensions, and the illustration shown is conceptual in nature for purposes of discussion herein and is not intended as limiting the scope of the embodiments shown and described herein.

Figure 2A:
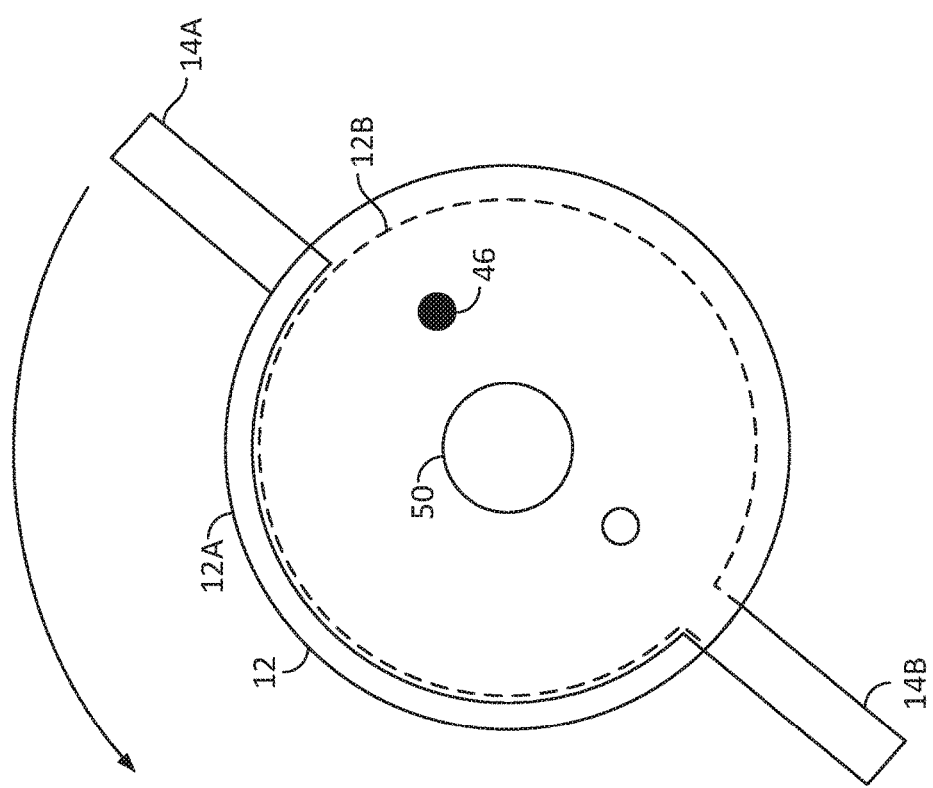
Figure 2B:
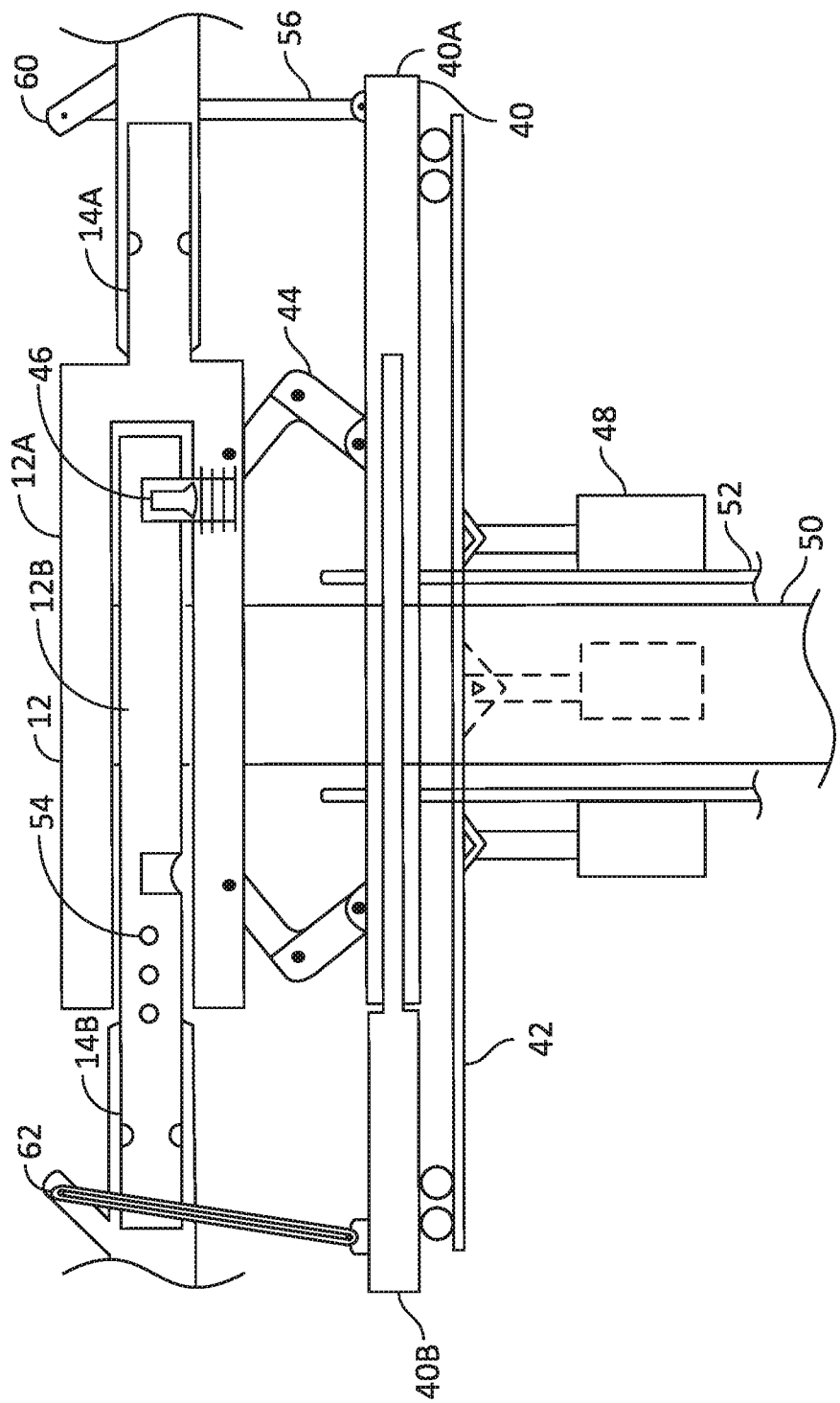

FIGS. 2A, 2B and 2C illustrate various views of a twin rotor blade set and rotor hub, according to one embodiment. FIG. 2A illustrates a top down view of a composite rotor hub 12 with one blade root attachment 14A to one (outer, in this illustration) driven portion 12A of the rotor hub 12 and a second, foldable or feather-able, non-driven blade root 14B affixed to a second (inner, in this illustration) non-driven portion 12B of the main two part rotor hub 12. As used herein, the term "driven" for a portion of the rotor hub refers to the fact that such portion is driven in rotation by direct coupling to the driveshaft for that rotor hub, and the "non-driven portion" of the rotor hub refers to the fact that such portion is not driven by direct coupling to the driveshaft, but is actually driven by the driven portion of the rotor hub when it is engaged in a certain position relative to the driven portion of the rotor hub. According to embodiments, a rotor hub may consist of one driven portion and any number of non-driven portions. It is assumed that the direction of rotation of the rotor hub 12 is counterclockwise as shown by the arrow. According to one embodiment, where coaxial, counter-rotating rotors are used, a mirror image of the composite hub of FIG. 2A with rotation in a clockwise direction (lower of the two rotor hubs), may be envisioned. The inner non-driven portion 12B of the rotor hub 12, represented by the dashed lines, according to one embodiment, is allowed to move freely inside the outer driven portion 12A with a limited radius of travel, as shown by the solid stop positions illustrated by the internal solid half circle attached to the blade root 14A. In this manner, the fully extended rotor blade roots 14A and 14B are illustrated in this figure, and the feathered or folded blade roots 14A and 14B may be seen in FIG. 2C.

As shown in FIG. 2B, the vertical driving shaft 50 of the rotor hub 12, coming from the hub transmission (not shown in this view), is fixed to and acts directly on the driven portion 12A of the rotor hub, allowing the non-driven portion 12B to rotate freely, and that the non-driven portion 12B of the rotor hub 12 will in turn drive the non-driven rotor blade 14A when the maximum relational travel between the driven or master hub and non-driven hub portions has been reached. It may be noted that the assembly process for the composite rotor is simply a matter of sliding the two main driven and non-driven portions 12A and 12B together and sliding the rotor driving shaft up to positive engagement and locking to the driven portion 12A. The relationship between the two blades is that they may be fully deployed opposite to each other or feathered with the blades lying in close proximity to one another. Although in these illustrations, two blades are affixed to the rotor hub system, any number of blades may be affixed, with one of the blades 14A fixed to the driven portion of the rotor hub system and with additional blades configured as non-driven, according to additional embodiments.

FIG. 2A also illustrates a spring-loaded solenoid lock 46, represented by a blackened circle in this illustration, which may be permanently affixed to driven portion 12A. The solenoid lock 46 serves to lock the blades and hub portions together when the blades are opposite to each other, i.e., in a fully deployed position and again when the blades are fully feathered as in FIG. 3C, again represented by a blackened circle but in a different place relative to the non-driven portion 12B of the rotor hub 12. The open circles represent alternate positions in which the solenoid 46 may be engaged. The spring-loaded solenoid 46 may also be seen in FIG. 2B, and the placement of the spring implies that the piston of the solenoid is normally engaged against the non-driven portion 12B. In this manner, when it is desired to either deploy or feather the blades, activating the solenoid 46 releases or unlocks the hub non-driven portion 12B from driven portion 12A, and when the blades reach the position desired, the piston of the solenoid 46 will automatically engage the appropriate locking hole in hub non-driven portion 12B. The solenoid 46 may also feature a brake pad affixed to its vertical tip, which may act to control or slow the rotation of one portion of the rotor hub in relation to the other portion.

It should be noted that in this disclosure, the term "feathered" implies that the blades are disposed one at least partially over another in folded position, as opposed to the use of the term to imply that the leading edge of the blade is facing the relative wind, such as used to describe feathering propellers to reduce drag. Blade pitch control rods or pitch links attached to the leading and trailing blade root edges connect to an upper swashplate, which is controlled via a lower swashplate by inputs from the collective and pitch or joystick controls, such as found in conventional helicopter designs. Other features, such as scissors links, counterweights, lead-lag vertical hinge pins, details of blade grips, flapping hinges, blade shock absorbers, Arthur Young stabilizer bars (flybars) and other features are not illustrated in FIG. 2A for the sake of simplicity, but such features may be incorporated into the rotor hub/blade design, according to embodiments. Additionally, rotor blades themselves may incorporate any number or combination of features, such as twist and taper profiles, aspect ratios, varying chord thicknesses, root cutouts, rigidity or semi-rigid designs, or other features, according to embodiments. According to embodiments, the rotor roots 14A and 14B may be half round segments to allow them to fully nest together, even beyond the close approximation shown in FIG. 2C, particularly if blade root cutouts are incorporated next to the rotor hub 12.

FIG. 2B is a representative side view of a composite hub structure 12 in more detail, according to one embodiment. The drawing is not specifically to scale. Herein, the use of the term "composite" implies that the hub system may comprise more than one single monolithic central hub structure with attachments for the rotor blades and the like, and is not intended to connote the material or materials of which the hub system may be made. At the top of this illustration, the composite rotor hub 12 may be seen with its driven portion 12A and the non-driven portion 12B with counterweights 54, the spring-loaded solenoid lock mechanism 46 and the rotor roots 14A and 14B. Lever arms 60 and 62 are fixed to and swivel about the rotor roots 14A and 14B for pitch changes to the rotor blades. The counterweights 54 balance the non-driven portion in relation to the driven portion of the hub. The non-driven portion may have less mass than the driven portion in order to fit between the upper and lower sections of the driven portion. The counterweights 54 ensure that equal weight between the driven portion and the non-driven portion. The rotor blade roots are where it is essential to have balance, like on a drive shaft, to avoid unwanted induced vibration. The driveshaft 50 of the mast, which rotates with the rotor hub 12, is surrounded by the non-rotating outer mast housing 52, to which are affixed servos 48 that receive collective and cyclic commands from the controls and act on the lower swashplate 42. Such servos 48 may be two or more in number and may be arranged as a Stewart platform with three servos. The upper swashplate 40, like the composite rotor hub 12, may comprise corresponding sliding segments 40A and 40B, which allow the upper rotating swashplate 40 to feather with the rotor blades 14A, 14B, mimicking the rotor hub 12 as shown in FIGS. 2A and 2C. Pitch links 56 are attached to the lever arms 60 and 62 to input collective and cyclic command movements to the driven blade 14A and to the non-driven blade 14B. According to one embodiment, when the upper swashplate 40 is in feathered position, the pitch links 56 nest in close proximity to one another. Scissor links such as shown at 44 allow movement of the upper swashplate 40 while ensuring that rotation of the upper swashplate portion 40A is, at all times, synchronous with the rotor hub driven portion 12A. According to another embodiment, the servos 48 may be positioned on the outer mast sheath 52 between the rotor hub 12 and upper swashplate 40 inside the pitch links. In that case, the servos 48 would act on the lower swashplate 42 by pulling thereon from above instead of pushing it upward from below, or may be arranged in an upside down Stewart platform. Such a configuration may result in a more compact rotor head assembly, which may also allow closer stacking of a coaxial counter-rotating rotor hub assembly pair. According to another embodiment, the servos 48 may replace and act as the pitch links 56 themselves and may be located respectively and attached to the driven and non-driven portions of the rotor hub, with one servo per rotor hub portion and configured with control inputs, such as electronic signals and power sources incorporated into the rotating driveshaft itself for a given rotor hub. Each servo would therefore control rotor blade pitch by direct attachment to its respective rotor blade lever arm 60 or 62. In such an embodiment, the use of such direct servos may obviate the need for a swashplate altogether, and since each servo is attached to its respective rotor hub portion, they may be nestled in close proximity together when the rotor hub is in its folded or feathered position, as discussed above for the pitch links 56. Fly-by wire systems may, according to one embodiment, be used to control individual blade pitch, and such fly-by-wire systems are assumed to be incorporated into further discussions of embodiments of a hybrid aircraft below.

FIG. 2C is a top view of a rotor hub 12, with the rotor roots 14A and 14B in a feathered configuration in which they nearly overlap each other. It is assumed that if the aircraft were hung underneath the rotor hubs illustrated in FIGS. 2A and 2C with the forward part of the fuselage pointing to the top of the page, and if the rotor hub 12 of FIG. 2A were stopped in that position, then airflow from forward flight of the aircraft would allow both roots and blades 14A and 14B to fall back and align themselves aft of the rotor hub 12 to the position shown in FIG. 2C.

Figure 3A:
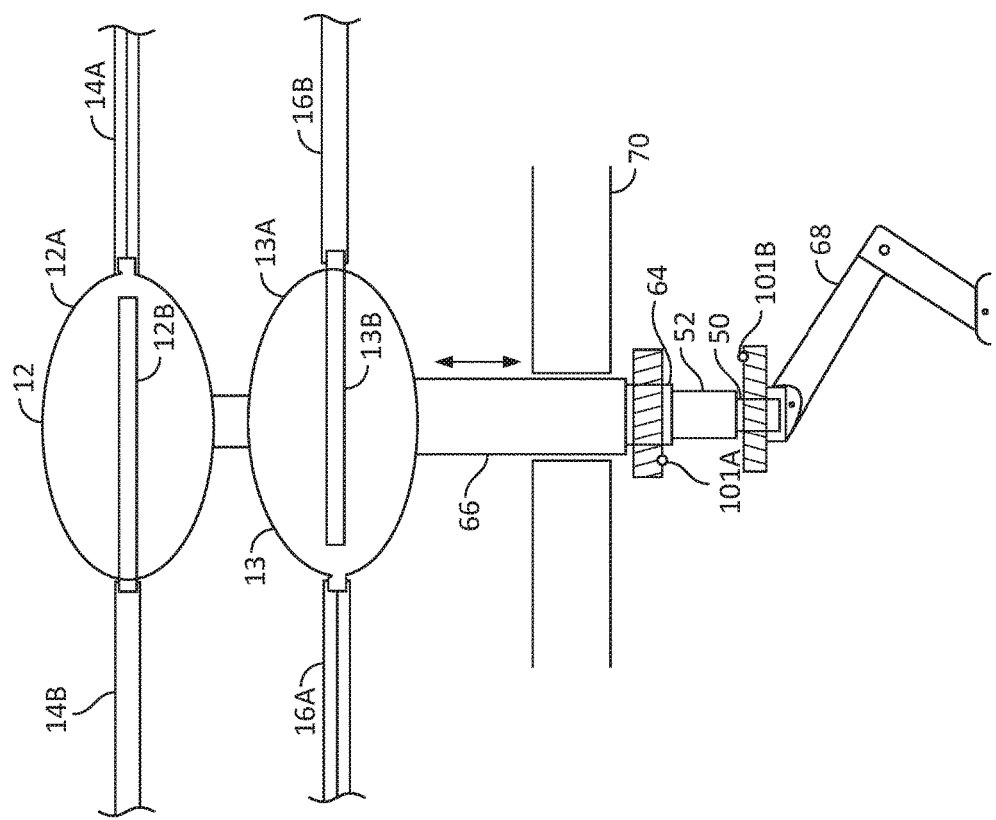
FIG. 3A is a side view of two coaxial counter-rotating rotor hubs and blades.

FIG. 3A is a side view of two coaxial counter-rotating rotor hubs and blades, and FIG. 3B is a top view of a pair of coaxial counter-rotating blade sets, according to embodiments. In FIG. 3A, the upper rotor hub/blade set includes the driven portion 12A of the rotor hub 12 and the non-driven portion 12B of the rotor hub, as has been previously illustrated. Not shown are details such as the corresponding upper swashplate and other details from FIG. 2B above, but which are assumed to be present. In this figure, a lower rotor hub/blade assembly 13 with driven rotor hub 13A and non-driven rotor hub portion 13B are illustrated, and are essentially mirror structures of the upper rotor hub/blade assembly, designed to rotate in a counter direction to the upper rotor hub/blade set. Driven blade 16A, therefore, is illustrated showing its trailing edge and non-driven rotor blade 16B presents its leading edge. It is assumed that the upper blade set, with driven blade 14A showing its trailing edge, and non-driven blade 14B, showing its leading edge in this illustration, rotates in a counter-clockwise direction viewed from above, and therefore the lower blade set will rotate in a clockwise direction, as shown in FIG. 3B. FIG. 3A also shows four concentric tubular sections of the rotor mast, including, from the innermost out, the rotating upper hub drive shaft 50; the non-rotating upper hub mast sheath 52 supporting and controlling the lower swashplate associated with the upper rotor hub 12; the rotating lower rotor hub 13 drive shaft 64; and the non-rotating lower hub outer mast sheath 66, with analogous functions to sheath 52. According to one embodiment, the upper rotor mast sheath 52 and lower rotor mast sheath 66 may incorporate streamlining shapes below their respective rotor hubs for aerodynamic efficiency and drag reduction purposes since both mast sheathes are non-rotating in relation to the fuselage 8 of a hybrid aircraft 10 of FIG. 1 above. The gears illustrated on drive shafts 50 and 64 are drawn to imply counter-rotation of the two shafts in relation to each other. There are many gear/belt arrangements possible for application to a coaxial counter-rotating helicopter transmission, the housing of which is shown as element 70 in this illustration, and such arrangements are well known in the art and are not discussed herein. Embodiments may incorporate any or all of such arrangements, as would be envisioned by on skilled in the art. According to embodiments, an auxiliary electric or hydraulic drive motor or motors (not shown in this illustration, but easily envisioned) may be added to the main rotor transmission/clutch drive mechanism (not shown, as described above) for low speed rotation of the rotor hubs through the gears of drive shafts 50 and 64 for purposes such as rotating the rotor hubs to deploy or fold the rotor blades for maintenance, stowage, or in addition for deploying the rotor blades from feathered configuration to deployed configuration in preparation for autorotation functions, for example in the event of main engine failure in a hybrid aircraft's fixed wing flight mode. The auxiliary motor(s) may also be used to move, augment and positively control rotor blade positions relative to the fuselage during in-flight transition modes from VTOL to fixed wing configurations and vice versa. Also not shown, but easily envisioned, may be a clutch/disc brake assembly affixed to the drive shafts 50 and 64 for purposes of decoupling the drive shafts from the main transmission and braking their rotation. The disc brakes may be horizontally affixed to the drive shafts, and the disc pad assemblies located on their respective non-rotating mast sheathes 52 and 66.

In addition to the elements or components described above, a hydraulic or mechanical scissor link 68 or links or other mechanism may be used to raise or lower the rotor hub(s) in relation to each other, which may be advantageous in reducing the moment inherent in vertically-stacked coaxial counter-rotating rotor blade sets, and/or to the fuselage 8 of a hybrid aircraft 10. This may be advantageous in stowing the rotor blade sets in their folded or feathered configuration, thus streamlining the aircraft if operating in fixed wing mode, as will be discussed further below. Indeed, scissor link or links 68, configured for vertically extending or retracting the rotor hub/blade sets in relation to the fuselage of an aircraft, is not typically found on conventional helicopter for the simple reason that there is no purpose or advantage for such an arrangement without the composite hub structure 12 and 13 and the ability to change in-flight VTOL to fixed wing flight mode configurations, i.e., from deployed to folded or feathered rotor blades, as discussed herein. Finally, sensors 101A and 101B may be affixed to the main drive 50 and 64 shaft gears or other location to witness that the two driven counter-rotating blades 14A and 16A are in vertical alignment with each other. The importance of this feature will be discussed in more detail below in discussions of methods of in-flight VTOL to fixed wing transitions, and vice versa. In FIG. 3A, the two sensors are shown opposite each other to correspond to the position of driven blades 12A and 13A in the illustration, for ease of conceptualization. Each time the two sensors pass each other on a vertical plane, a signal is relayed to an instrument on the flight control panel in the cockpit, to indicate the rotor RPM and more particularly the bearing relative to the longitudinal axis of the aircraft of the rotor driven blades 12A and 13A crossover point, since this relative bearing may change over time as the aircraft yaws in various directions in a typical VTOL flight mode profile.

FIG. 3B illustrates an upper two blade rotor set consisting of a driven blade 12A and non-driven blade 12B and a lower two blade rotor set consisting of a driven blade 16A and non-driven blade 16B. In this illustration and embodiment, the upper blade set rotates in a clockwise direction and the lower blade set counter-rotates relative to the upper blade set in a clockwise direction. This provides an efficient symmetry of lift at all times, which may be advantageous in transitioning from one flight mode to another, according to embodiments. The fuselage of the hybrid aircraft is not shown in this figure since, as described above, the relation of the long axis of the fuselage 8 may be pointed in any direction, even if the blades were frozen or braked to stop rotation in relation to each other at any given time. According to embodiments, the rotor blades may be of relatively stiff construction, with a thick chord tapered profile and relatively short disc span, since the primary purpose of the rotor blades is to provide a high lift capacity, taking advantage of the biplane effect of counter-rotating blades, as opposed to a compromised design that must incorporate high lift and low drag profiles in a single or unique lifting structure. Blades constructed as discussed herein may be of such high lift profile that maximum rotor speeds may be reduced, leading to quieter flight operations and, therefore, reduced drag and induced drag. Additionally, since a tail rotor is not required with coaxial counter-rotating rotor blade sets, noise from a tail rotor in the vortex of the main rotor disc is eliminated and safety issues associated with a tail rotor flying through such vortex are eliminated.

Figure 4:
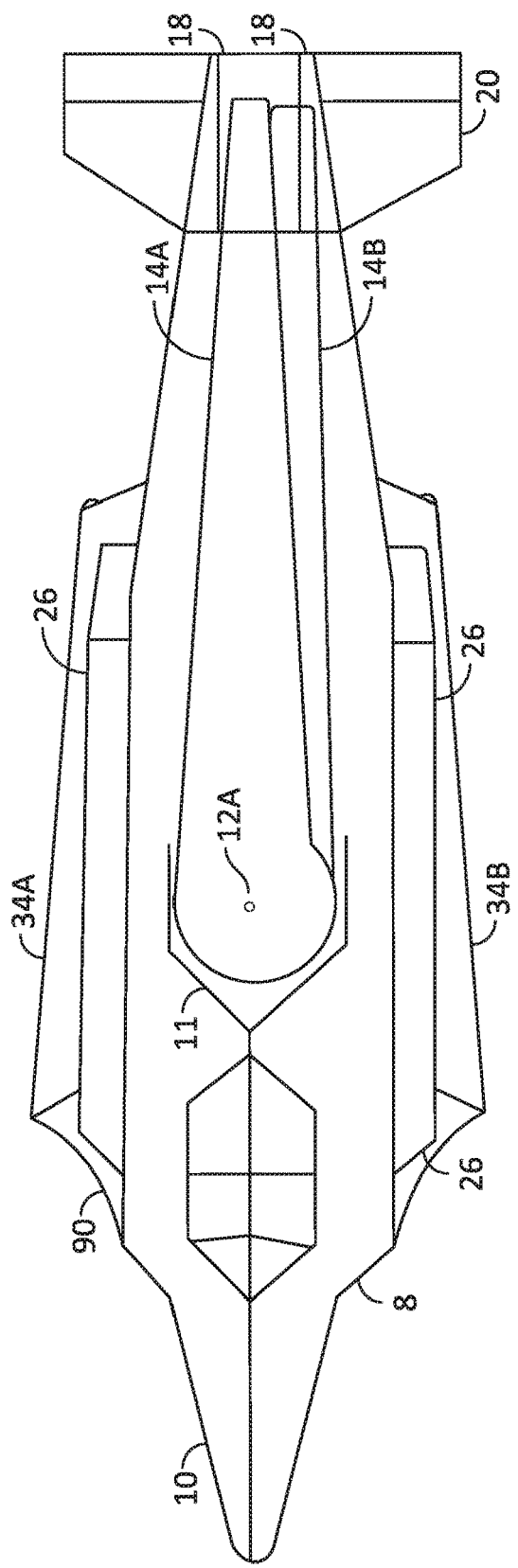
FIG. 4 is a top view of a hybrid aircraft with wings and rotors folded, according to one embodiment.

FIG. 4 illustrates a top view of a hybrid aircraft 10 with generic fuselage 8 showing two, upper and lower, coaxial, counter-rotating rotor blade sets (only the upper rotor driven portion 12A and driven blade 14A and non-driven blade 14B are visible in this drawing) in stowed configuration. This stowed configuration may be achieved by applying a slight negative collective pitch to the blades to allow them to nestle leading and trailing edges in this configuration, and with the swing-wings 34A and 34B folded and stowed for aircraft stowage or transportation purposes, according to one embodiment. In this illustration, leading edge root extensions (LERX) 90 may be seen, as also shown in FIG. 1 above. According to one embodiment, twin rudders 18 and horizontal stabilizers 20 have been rotated such that the rudders are near vertical and that the ends of the feathered and stowed rotor blades 14A, 14B, 16A and 16B have been captured in their stowed positions. In this illustration, the vertically extendible rotor hub/blade sets have been lowered to their lowest position and have been shielded by a fairing 11, as also shown in FIG. 1. Twin main gas turbine engines 26 may also be seen in this view, according to one embodiment.

Figure 5:
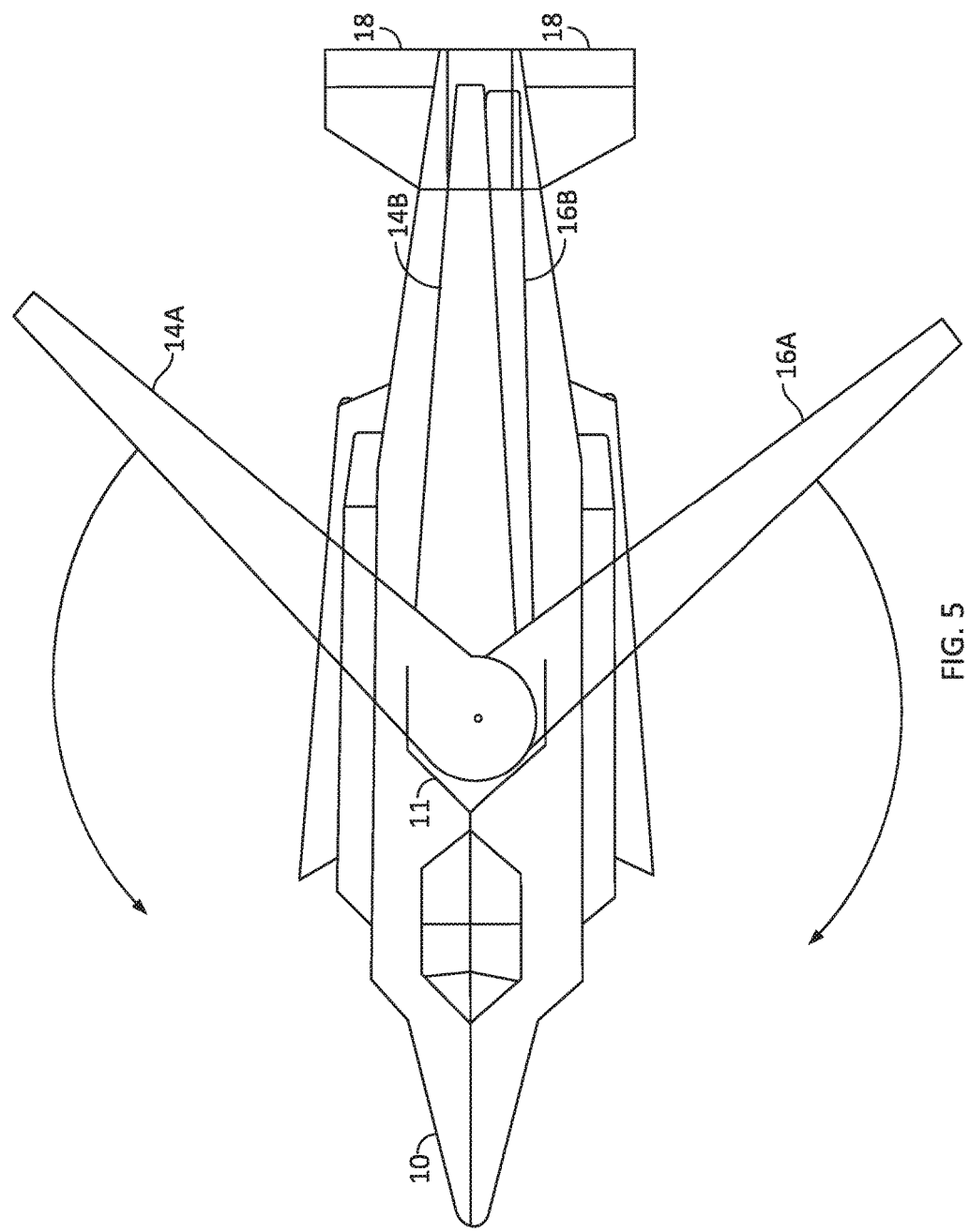
FIG. 5 is a top view of a hybrid aircraft in one phase of a flight mode, according to one embodiment.

FIG. 5 illustrates a top view of a hybrid aircraft 10 with rotor blade sets 14 and 16 in initial phase of deployment, according to one embodiment. In this view, the vertical rudders 18 have rotated to their lower position to release the previously captured rotor blade tips and the vertically extendible rotor hubs/masts have been raised to clear the fuselage fairing 11. The direction of rotation of deployment of each blade set, upper and lower, have been indicated by the arrows showing counter-rotation. Deployment of the blades from or to their folded positions may be accomplished by the auxiliary motors discussed in FIG. 3A above, according to one embodiment and method. Deployment of the rotor blades from feathered or folded position may also be accomplished, for example, during flight mode transition from fixed to VTOL configuration, by the main engine(s) or power turbine(s), according to embodiments. In such a method, recovery of the blade sets from deployed to stowed configuration may be aided by airflow tending to fold each blade set on itself as a result of forward flight, which may also be controlled by rotating drive shaft brakes or the auxiliary motors discussed previously, as will be discussed further below.

It may be noted that in this illustration, the non-driven blades 14B corresponding to the upper rotor hub and 16B of the lower rotor hub have not yet reached the extent of their fully deployed travel within their respective composite hubs, as discussed in FIGS. 2A, 2B and 2C above. Only when the two driven blades 14A and 16B have met and crossed in counter-rotation will the individual blade sets be fully deployed and locked together with the spring loaded solenoids of FIG. 2B above. It should also be noted that FIG. 5 may represent the blade sets falling back to their stowed and feathered positions if the direction arrows were reversed in this illustration. The symmetry of the counter-rotating blade sets in relation to airflow over the aircraft during deployment or feathering, may greatly enhance the stability of the whole hybrid aircraft during in flight transitions from VTOL to fixed wing flight modes and vice versa.

Figure 6:
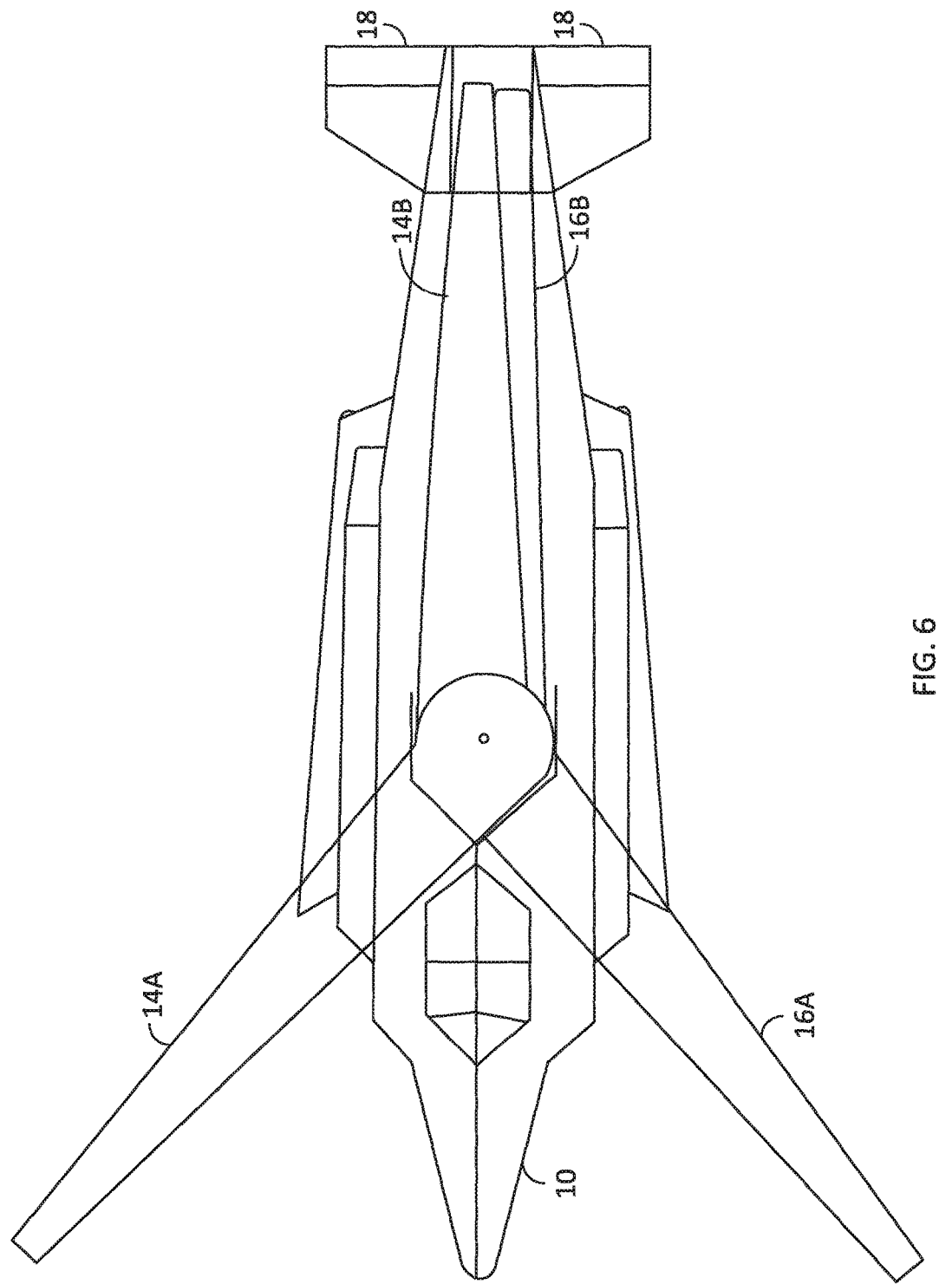
FIG. 6 is a top view of a hybrid aircraft in one phase of a flight mode, according to one embodiment.

FIG. 6 illustrates a top view of a hybrid aircraft 10 showing further deployment of the blade sets 14 and 16, according to one embodiment. Such a configuration may be in preparation for a VTOL flight phase configuration such as a takeoff from a carrier deck, for example. It should be noted that each blade set is not yet fully deployed and locked in this view, as noted above for FIG. 5. Not visible in this view are the horizontal stabilizers/elevators 20 of FIG. 4, since they are masked by the lowered twin rudders 18 in this embodiment which would present the entire empennage of a hybrid aircraft 10 in "X" configuration if viewed from aft looking forward, according to one embodiment. With the twin rudders 18 in lowered position to release the rotor blades, VTOL flight safety is enhanced since the rudder profile is further out of the way of the rotor blade arc or rotor discs.

Figure 7:
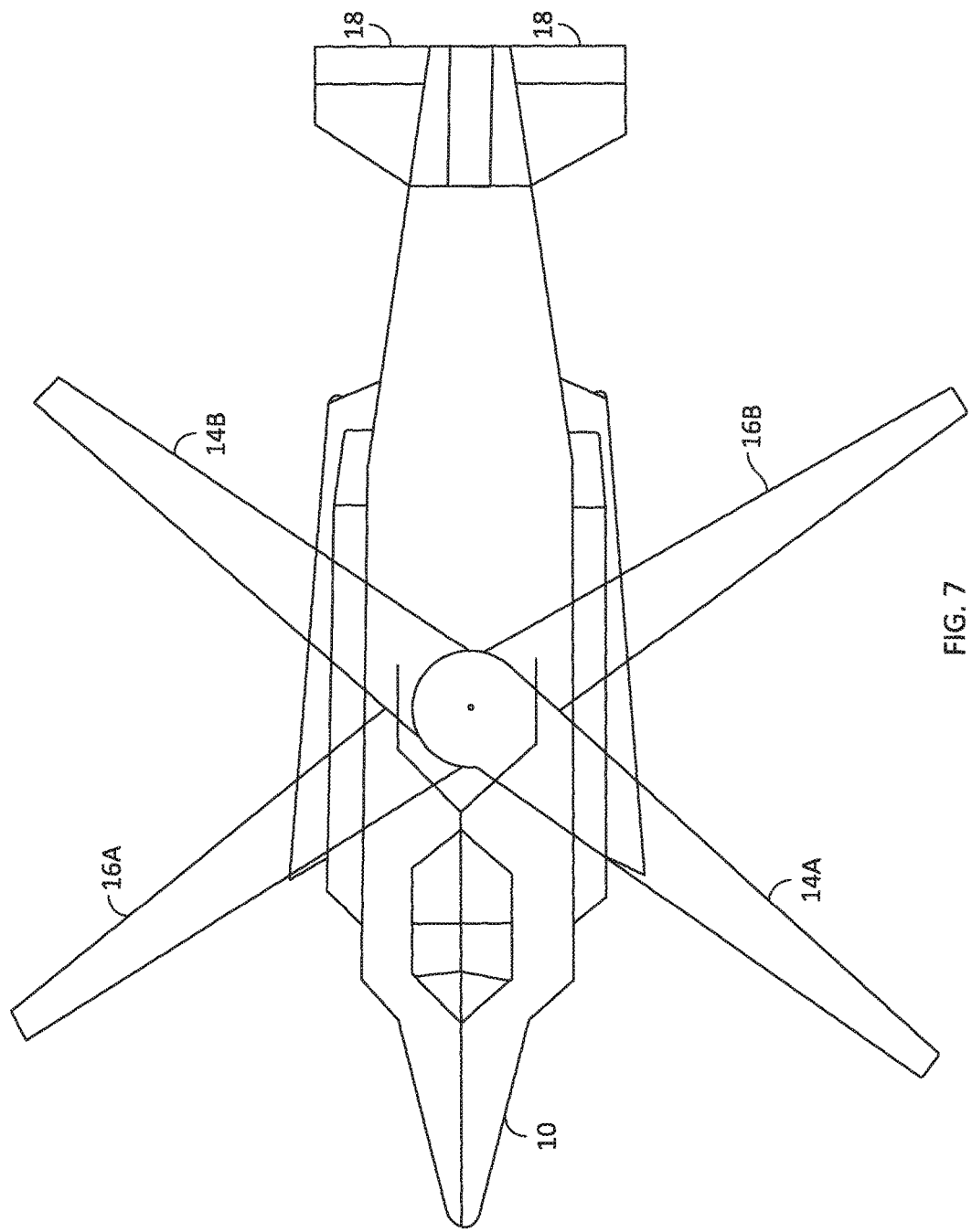
FIG. 7 is a top view of a hybrid aircraft in one phase of a flight mode, according to one embodiment.

FIG. 7 is a top view of a hybrid aircraft 10 in VTOL phase of a flight mode, according to one embodiment. In this view, the individual rotor sets 14A and 14B, and 16A and 16B are in their fully raised and locked configuration, as described above in previous figures, and as a result of the two driven blades 14A and 16A having completed at least one half revolution and thus capturing and locking their non-driven blades in their respective rotor hubs 12 and 13 of FIG. 3A. The twin rudders remain in their lowered position in this flight mode, according to one embodiment, which may uncover the side NOTAR gas vents discussed in FIG. 1 above. The use of a NOTAR system on a coaxial counter-rotating blade helicopter system may be advantageous in that the rotor blade speeds may be matched to one another throughout an entire flight, since there would be no need to mismatch the rotor disc speeds to induce or control yaw, leading to even more precise control of the aircraft in VTOL mode. A NOTAR system is not specifically needed for a coaxial counter-rotating rotor helicopter, however, as there is no induced torque on the airframe because the counter-rotating torsional forces of the rotor discs cancel each other. A traditional means of controlling yaw on such aircraft is to vary speeds between one rotor driveshaft and another, often requiring twin engines for that purpose alone with each engine driving one rotor set, and therefore inducing a torque differential which acts on the airframe hung below the rotor blades. Such traditional aircraft induce rolling or pitching secondary effects as a result of such a method of controlling yaw. In the present discussion of a hybrid aircraft 10, bleed air from the main engines to NOTAR gas ports or even thrust vector nozzles on the main engines themselves may be substituted for torque differential yaw control systems, according to embodiments. Constantly matched rotor speeds between the upper and lower rotors may also aid transition from one flight mode to another with NOTAR yaw control, particularly since it may be desirable to transition from one flight mode to another in as stable a configuration and flight path as possible. Moreover, with NOTAR systems, there would be no need to induce an imbalance into the rotor disc sets simply to control yaw until conventional fixed wing flight surfaces associated with the empennage could take over. It should also be noted that, according to one embodiment, the NOTAR system may be used with fixed wing flight to augment maneuverability of the aircraft during high speed maneuvers.

In this figure, the upper rotor blade set turns counter-clockwise and the lower blade set turns clockwise. According to one embodiment, forward thrust on the fuselage 8 of an aircraft 10 may be augmented or even primarily furnished by thrust from main engines, thus increasing the potential speed of the aircraft in VTOL mode, widening the stable transition speed range from one mode of flight to another, and to not have to rely on the rotor disc as the primary means for providing forward thrust. Indeed, it has been shown that in such a configuration, little power is needed to maintain rotor speed and the lift of the rotor disc, and most of the engine(s) power may be reserved for forward thrust on the airframe.

Figure 8:
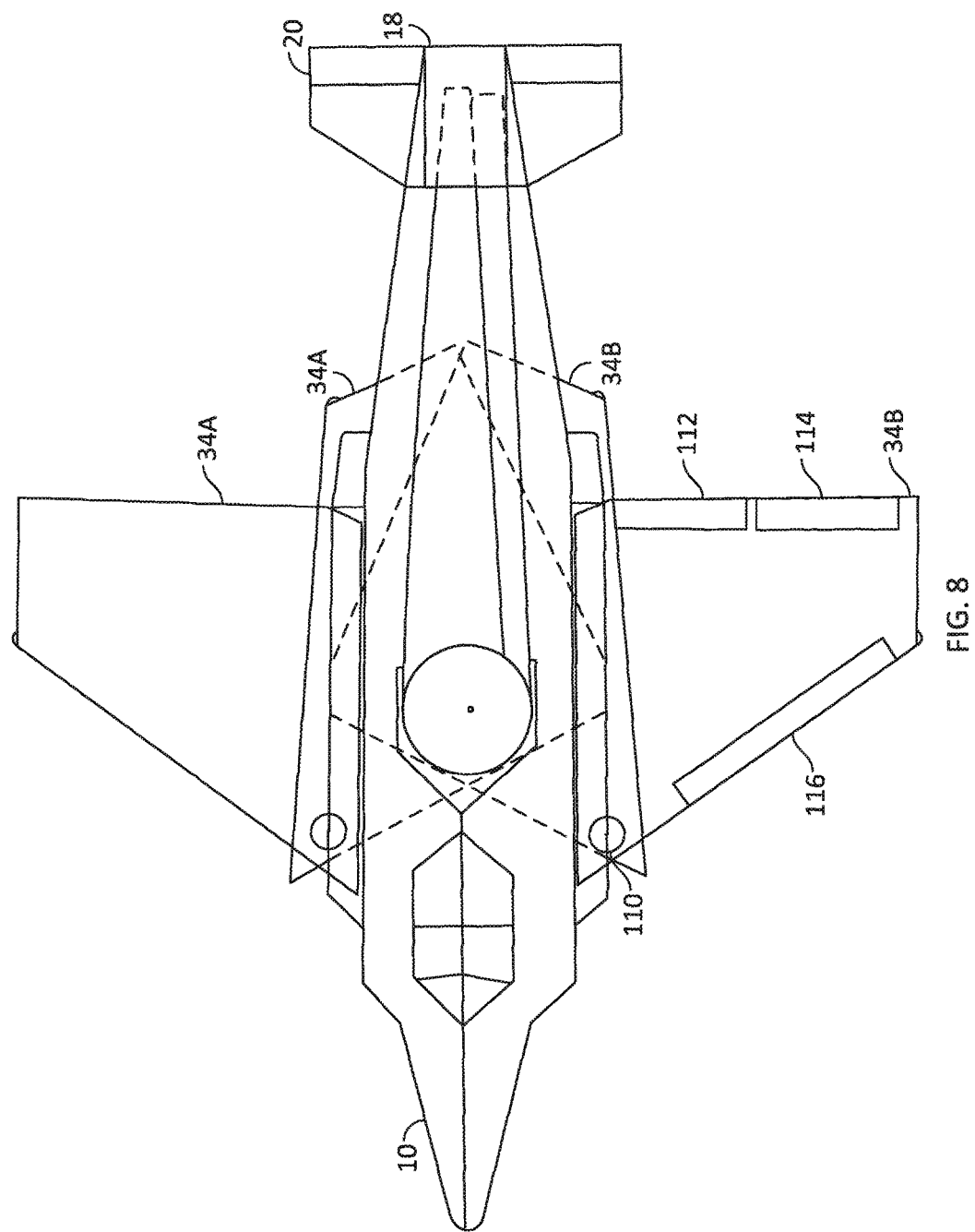
FIG. 8 is a top view of a hybrid aircraft in one phase of a flight mode, according to one embodiment.

FIG. 8 is a top view of a hybrid aircraft 10 with twin, coaxial, counter-rotating blade sets in folded and stowed position, and with the main swing-wings 34A and 34B in both folded, as shown by the dashed lines, and deployed positions around the main swivels 110, according to one embodiment. Small electric or hydraulic auxiliary motors may be incorporated into the fuselage structure 8 to move the wings from deployed to stowed configurations, according to embodiments. The left or port side deployed wing 34B illustrates features such as ailerons 114, flaps 112 and leading edge slats 116, and may also incorporate leading edge dogtooth features, according to one embodiment. The starboard or right wing does not show these features for ease of illustration, but such features are assumed to exist as for the port wing. The twin rudders 18 and horizontal stabilizers/elevators 20 have been raised to their fixed wing flight position, and locking in the distal tips of the rotor blade sets, according to one embodiment discussed herein. Such a fixed wing flight mode configuration may be the result of a completed transition from VTOL mode to fixed wing mode in flight, or may be the initial flight mode set for takeoff or landing from an adequate runway or deck, including catapult launches. With the swing-wings stowed for VTOL flight mode, as illustrated in previous figures above, efficient rotor blade function may be realized as there is less downdraft interference with the wing upper surfaces out of the way of the rotor blade induced air mass flow.

Figure 9:
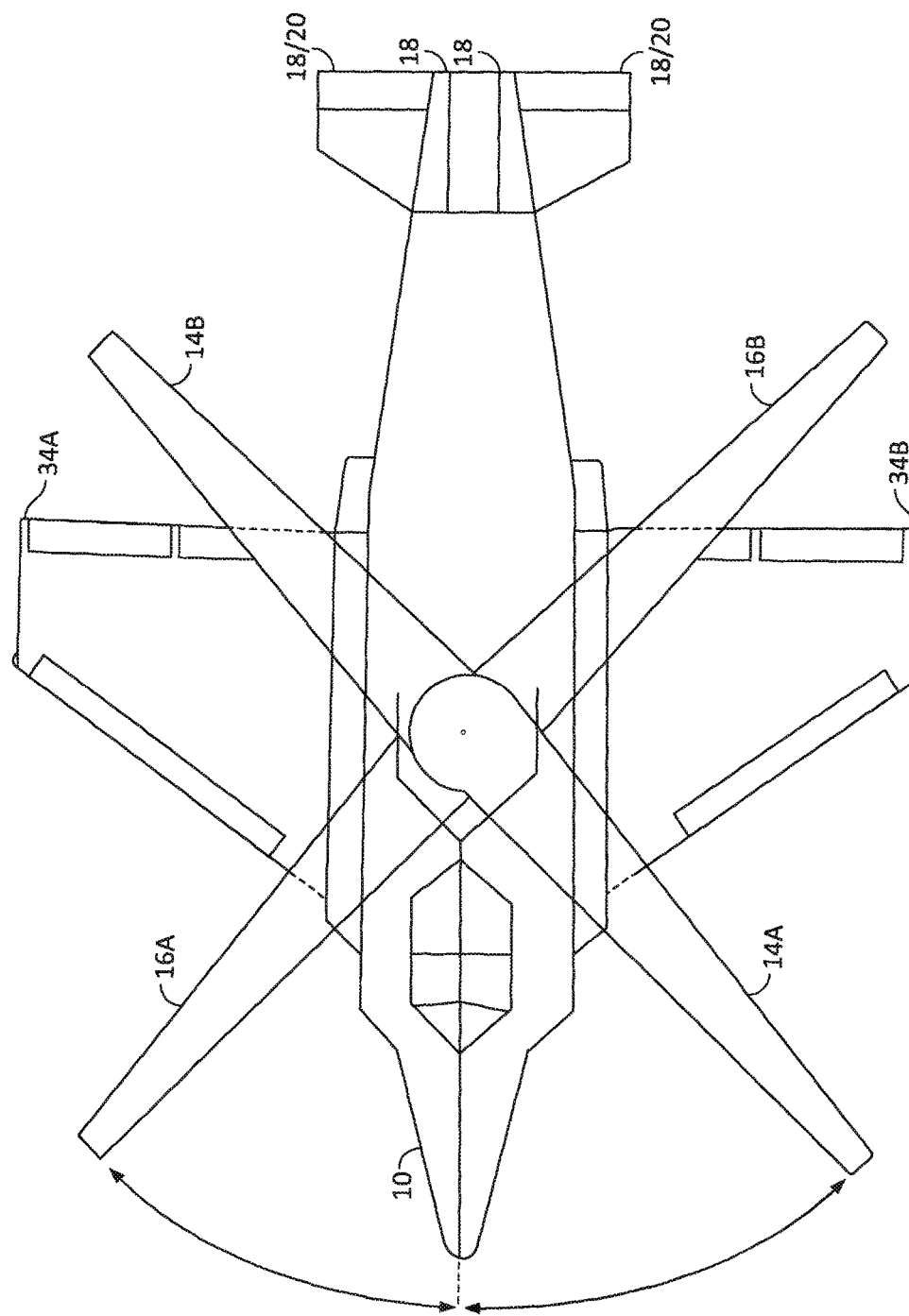
FIG. 9 is a top view of a hybrid aircraft in a transitional phase between flight modes, according to one embodiment.

FIG. 9 is a top view of a hybrid aircraft 10 in a transitional phase of a flight mode, according to one embodiment. In this illustration, each rotor blade set consists of two rotor blades and each rotor blade set is composed of a driven or master rotor blade and one folding non-driven blade, all of which are fully deployed, according to one embodiment. Since this figure illustrates a transitional phase from VTOL to fixed wing or vice versa flight modes, both the swing-wings 34A and 34B and the coaxial, counter-rotating rotor blade sets are deployed at the same time, such transition phase intended to be of short duration, according to methods. Such a transition phase may also include, for instance, an initial fixed wing flight mode, followed by imminent or complete engine failure, achieving best glide slope, deployment of the rotor blades by the auxiliary electric motors discussed under FIG. 3A above, and subsequent swing-wing folding, also by auxiliary electric motors discussed in FIG. 8 above, in preparation for an autorotation maneuver using collective commands to set the craft down safely, according to one method. In this figure, the rear empennage of the aircraft shows two potential configurations, with the twin rudders raised in preparation for being lowered to capture the rotor blades if the transition is from VTOL flight mode to fixed wing flight mode or already lowered after releasing the rotor blades to transition from fixed wing to VTOL flight mode. It should be noted that in this instance, the arrows in this figure describe a relative arc of approximately 45 degrees on either side of the aircraft heading, and not rotor rotational direction, as will be described in more detail in a discussion of methods below.

The well documented efficiency of coaxial counter-rotating rotor blade sets in providing a high degree of lift in relation to power requirements may be advantageous in transitioning from one flight mode to another, according to embodiments herein. Additionally, it should be noted that the relative symmetry of coaxial counter-rotating rotor blades may aid in the stability of the flight path, as may be advantageous for such transitions, particularly since there is greater stability due to gyroscopic effects in the rotor discs when rotor speed is elevated, and which diminishes as rotor speed is reduced in preparation or initiation of transition from one flight mode to another, according to methods. Further, in this embodiment, the twin jet turbine main engines provide energy for both forward thrust and rotor set rotation, and as has been discussed above, the ratio of power requirements for the rotor disc rotation, which is low, to that needed for forward thrust is advantageous in providing a greater range of aircraft speeds during which transition from one flight mode to another may be achieved.

FIG. 10 is a rear perspective view of the empennage of a simplified exemplary fuselage of a hybrid aircraft, according to one embodiment. This rear view sketch shows a hybrid aircraft with twin coaxial, counter-rotating blade sets deployed, swing-wings extended, and rear empennage in VTOL flight configuration, shown as dashed lines, according to one embodiment. In this illustration, the split rear empennage, each half consisting of a rudder 18 and horizontal stabilizer with elevators 20, has been lowered to free the rotor blades from their stowed and captured position aligned with the long axis of the fuselage. Viewed from the rear, the empennage now presents a flattened "X" pattern which moves these flight control surfaces downward in relation to the rotor blade discs, as seen under rotation, and also uncovers the high pressure air slots on each side of the rear fuselage. These air slots, with an internal slide valve (not shown in this illustration) serve to channel high pressure turbine bleed air perpendicularly out of the fuselage to control yaw in the VTOL configuration of the aircraft. The internal slide valves, one on each side of the fuselage, are controlled by the outside pair of rudder pedals in the cockpit, and high pressure air directed to one side or the other of the fuselage may turn the fuselage about the coaxial rotor hub vertical axis. According to other embodiments, the rear empennage may be fixed, i.e., non-rotating, and rotor blade capture and stowage may be accomplished by means of flaps on the upper fuselage, similar to those used for stowing retractable landing gear, to lower profile and interference drag on the airframe during fixed wing mode flight operations. Single or dual rudders with horizontal stabilizer/elevators or stabilators may also be found in different configurations, according to embodiments. In additional embodiments, the maximum circumference of the rotor disc (blades deployed and rotating) or empennage profile will be such that no interference with the empennage is possible to avoid boom strikes or mast bumping.

FIG. 11 is a top perspective view sketch of cockpit controls and layout of a hybrid aircraft, illustrating controls for both fixed (swing) wing and VTOL configurations of the aircraft, according to one embodiment. In this view, a collective lever 150 with throttle may be seen to the pilots left side, and a second throttle 152 which may be slaved to throttle 150 on the side console may also be seen. The throttle 152 may be used in fixed wing mode to control thrust of the twin turbines as is conventionally performed. According to one embodiment, the main thrust engines may be separate from the main helicopter transmission twin turbines, and in that case the throttle for fixed wing thrust controls the main engine thrust, while the throttle on the collective lever controls the helicopter turbines separately. In the case where, as described in FIG. 1 above, the twin turbine main engines provide energy for both direct thrust, for fixed wing operations, and in one embodiment via a gated power turbine, to drive the helicopter rotor transmission, both throttle sets control the main engines, and the master/slave relationship between the two throttle sets are maintained, according to embodiments. In such configuration, the rotor hub drive shaft(s) may incorporate clutches and disc brakes to allow the rotor blades to be decoupled from the main transmission. According to one embodiment, there may be two sets of coaxial rudder pedals 154 and 156, with the outer set 154, left and right, controlling the high pressure bleed air to the NOTAR slide valves in the rear fuselage for VTOL mode of the hybrid aircraft, and with the inner set 156 controlling the twin rudders in the fixed wing mode of the hybrid aircraft, allowing the pilot to easily switch between the two modes of controlling yaw. Both rudder sets incorporate rudder top pressure brakes for the main landing gear, and are also connected to the steerable nose wheel set. It may be envisioned that a pilot may use both left rudders simultaneously, for example, or both right rudders, which may then not only affect the NOTAR yaw control but also the rudders themselves at the same time, which may allow for increased maneuverability combinations not found with rudders alone. In this manner, according to one method, increased yaw speed and slight upward pitch of the tail of the fuselage may be envisioned, as well as other combinations of flight controls that would not be possible for either a simple helicopter or fixed wing aircraft.

Pitch and roll controls for both VTOL and fixed wing modes is accomplished by the central stick/cyclic/joystick 158, with cyclic commands translated to the swashplates of the coaxial rotor hubs in VTOL mode and to the ailerons and elevators/canard wings in fixed wing mode, according to one embodiment. In one embodiment, both cyclic and elevator/canard wings may be linked for VTOL mode to allow for more maneuverability options and flexibility. According to one embodiment, the leading edges of the main swing-wings 34 may feature full length, automatic leading edge slats 116 of FIG. 8 above, and flaps may be set by the pilot by an electric switch on the central stick or joystick. Such features may allow for a greater range of speed and airframe stability during which the rotor blade sets may be deployed or stowed during transitions from fixed wing to VTOL flight modes, or vice versa. The use of leading edge slats/fuselage canards and flaps or a combination thereof may also allow for a more stable and flatter angle of attack for the swing-wings during rotor blade deployment and stowage operations, thus allowing the counter-rotating rotor sets to deploy near or at flat pitch for greater aircraft stability in transitions from one flight mode to another. In one embodiment, the use of coaxial counter-rotating rotor sets allows for intuitive flight controls in VTOL mode, with no adverse pitch tendencies in right or left turns that would be associated with a single rotor disc. Because one embodiment discussed herein uses coaxial counter-rotating rotor blades, maneuvers such as flat turns, funnel maneuvers and other maneuvers such as takeoffs in any direction regardless of relative wind direction associated with such a system for VTOL mode are possible. Application of forward cyclic control in VTOL mode applies increased pitch 90 degrees to starboard of the fuselage on the rotor blade set 16A and 16B, and increases pitch 90 degrees to port of the fuselage on the rotor blade set 14A and 14B, lifts the rear of the fuselage resulting in a nose down pitch on the aircraft, because both rotor discs, counter-rotating to each other, act as spinning gyroscopes and the resultant force is applied approximately 90 degrees in the direction of rotation of each rotor disc. As mentioned previously, fly-by-wire technology may simplify cyclic commands to translate desired motion controlled by cyclic stick movement into pitch changes on the counter-rotating rotor blades via their respective blade hubs and correspondingly into movement of the aircraft in any lateral direction. Aircraft fuselage heading is controlled by the rudders, and collective controls vertical movement, with combinations of all three control sets resulting in complex maneuvers that only helicopters can perform.

One embodiment is a method of carrying out one or multiple in-flight transition(s) from VTOL flight mode to fixed wing flight mode and vice versa. For discussion purposes outlining one such method, FIG. 9 may be used as one representative embodiment of a hybrid aircraft disclosed herein with swing-wings and the features illustrated thereon, twin coaxial counter-rotating two blade rotor sets, twin jet engines to provide rotor power through a transmission as well as direct forward thrust, a bleed air NOTAR system for VTOL mode yaw control and an empennage capable of partially rotating to assume a VTOL configuration and a fixed wing flight configuration, as discussed previously. It is assumed that either of the jet engines, operating alone, may be sufficient to power the aircraft in sustained flight. Any of the following flight plans, corresponding to a desired mission profile, may be considered for examples of in-flight transition methods:

Takeoff in VTOL mode, transition to high speed fixed wing mode for long distance leg, transition to VTOL mode and landing;

Takeoff in VTOL mode, transition to fixed wing mode and landing;

Takeoff in fixed wing mode, including a potential catapult launch, transition to VTOL mode for a mission, landing in VTOL mode;

Takeoff in fixed wing mode, transition to VTOL mode, transition back to fixed wing mode and landing;

Takeoff in VTOL mode, landing in VTOL mode (no transition);

Takeoff in fixed wing mode, landing in fixed wing mode (no transition); and/or

Other combinations involving multiple in-flight transitions from one flight mode to another In-flight transition methods from fixed wing to VTOL flight modes and vice versa may differ slightly with respect to methods of deploying the rotor blade sets and recovering and stowing them, according to embodiments described herein. This is primarily due to the relative wind forces and direction and the position relative to the fuselage of the driven rotor blades at the moment they pass each other vertically in flight, which may vary considerably because of VTOL flight profiles involving changes of aircraft direction during a flight independent of the rotor blades turning above the fuselage.

Using FIG. 9 above as an illustration of transitional deployment of the coaxial counter-rotating rotor blades from lowered and stowed position, such maneuvers may be relatively straightforward due to the symmetry of the deploying blades with respect to forward flight and the resulting airflow, and enhanced as rotor speed increases and thus the stabilizing gyroscopic effect of the rotor discs increases. The empennage is rotated to release the blade roots and uncover the NOTAR gas ports, and the twin port and starboard rudder pedals of FIG. 11 may be used to ensure yaw control during the transition, according to one embodiment. The rotor hubs may be elevated clear of the fuselage fairing, the spring loaded solenoid 46 of FIG. 2B may be activated to unlock their individual blade sets and power may be applied to the rotor transmission to start rotation, either from the auxiliary motors or main engines via a clutch mechanism, such as mentioned previously. It may be noted that since the relative wind is essentially head on and following the longitudinal axis of the aircraft in fixed wing flight that the driven rotor blades 14A and 16A will advance into the wind symmetrically upon deployment and locking of their respective non-driven blades will occur once the driven rotor blades have passed one half revolution. Additionally, the non-driven blades will always tend to feather into the relative wind until they are locked opposite to the driven blades in the rotor hubs by the spring loaded solenoid. Once locked, rotor blade speed may be increased to a desired RPM value and maintained. Once the rotor discs have taken over sufficient lift to transition the aircraft from fixed wing to VTOL flight mode, the swing-wings 34A and 34B may be folded to their stored position in the fuselage. At this point, flight mode transition is completed for this instance. The transition speed range may vary depending on the embodiment of the hybrid aircraft, but generally it may be assumed that a speed range corresponding for fixed wing aircraft $V_{fe}$ or Velocity with flaps extended to $V_0$ or stall speed with flaps extended may be advantageous for flight profile transitions. The use of flaps, canard wings, if the present aircraft is so equipped, and leading edge slats in preparation for a transition maneuver may serve to widen the transition speed range and also tend to lower or flatten the pitch angle of the fuselage at the lower speeds necessary for flight mode transition, all of which may be advantageous in deploying or recovering and feathering rotor blade sets.

A transition from VTOL flight mode to fixed wing mode may involve one additional step to allow safe, symmetrical recovery and stowage of the rotor blade sets. In VTOL mode, forward speed is brought within the transition speed range outlined above. The swing-wings may then be deployed, ensuring that control surface locks have engaged for the flaps and ailerons. If necessary, flaps may be deployed to keep the aircraft itself in a relatively flattened pitch profile, and the main engines thrust adjusted to unload the burden of lift from the main rotors. Once within a satisfactory flight profile and transition speed range, the rotor blades may be adjusted to flat collective pitch and power removed or reduced to the rotor blades. These latter two steps may be important because they prepare the rotor hubs in anticipation of unlocking their driven and non-driven blades from each other and subsequent swiveling of the driven and non-driven portions of both the rotor hubs and upper swashplates with their pitch links to a feathered position. Before unlocking the blade sets by activating the spring loaded solenoid in each of the rotor hubs, the pitch links should already be set for neutral or flat collective pitch and the cyclic command diminished as the pitch links will lose their effectivity as far as cyclic commands are concerned once the hub portions are unlocked and begin to swivel to feathered position. Collective pitch inputs will continue to be effective, even with the rotors and upper swashplates in folded position. After these steps, the rotor discs are at this point acting as essentially flat discs and lift is being transferred to the swing-wings.

It should be noted that in this first phase of the transition, the gyroscopic forces of the rotor discs will contribute to stability during and after swing wing deployment and then gradually decrease as rotor disc speed decreases. It may additionally be advantageous to the pilot to know, in advance of this transition operation, the precise relative bearing (relative to the fuselage or aircraft current heading) to the point at which the driven blades 14A and 16A cross each other, and then to turn to match that with aircraft heading or be within approximately 45 degrees either side of the nose to that bearing as shown by the range of the double headed arrows in FIG. 9 (which do not represent rotor blade rotational direction). In this manner, as the blades are unlocked and come to a stop or are braked with drive shaft brakes (not shown, but discussed previously) or by engagement of the electric auxiliary drive shaft motors, and the driven and non-driven blades are unlocked from each other, they may fold back with pressure of the relative wind to align themselves in folded or feathered position prior to the rotor hubs being lowered. Note that this differs from the blade deployment method in the previous paragraph, wherein the driven blades will automatically be already initially aligned with aircraft heading as they deploy forward from their stowed and aligned position on the fuselage. In any case, once the blades are unlocked in preparation for stowing, the non-driven blades 14B and 16B will tend to feather into the relative wind and the driven blades 14A and 16A may be allowed or powered to move back or fall back in reverse direction of their normal rotation to complete blade set feathering. Once the individual blade sets have reached their feathering position, the spring loaded solenoid 46 will automatically engage and lock them in that position, as discussed previously. At that point, the blade sets will always want to weathervane with the rotor hubs facing the relative wind, which is a stable position from which to be able to stow them properly and lock them to the fuselage. According to embodiments herein, the empennage may be rotated to capture the blade tips for stowage. Once the empennage is raised to its fixed wing flight mode, the pilot should ensure smooth operation of the rudder and elevators before resuming a desired course in high speed fixed wing flight mode.

Another embodiment is a method of carrying out a safe landing of a hybrid aircraft 10 in the event of imminent or complete engine failure. In the event of imminent failure of the aircraft in fixed wing mode, such as imminent or complete engine failure, the rotor blade sets may be deployed and used in unpowered, auto-rotation mode to allow for more landing options for the aircraft, assuming that they can be fully deployed and that the aircraft has sufficient altitude to achieve minimum rotor speeds in time. Auto-rotation as a means of landing may be used at any time in VTOL configuration or mode, as with any conventional helicopter. Auto-rotation landing modes for the hybrid aircraft, with swing-wings folded, may also be used to approach a noise sensitive landing site to set the aircraft down with minimum noise, followed by engine start or re-start at an appropriate later time for subsequent takeoff of the aircraft in either VTOL or fixed wing mode.

According to one embodiment, a hybrid aircraft may feature twin propulsion propeller pods or nacelles on the port and starboard side of the fuselage 8, and such pods may be mounted on stub wings. Each of the propulsion pods may also supply the power for these for one of the contra-rotating rotors overhead. With such a configuration, the starboard pod may be linked with the rotor that is sweeping forward on the starboard side, and vice versa with the port side pod. With such a configuration, in the event of a power outage, the remaining power plant would automatically compensate for the increased drag on its side. Pitch changes in the propulsion pod-propeller relative to its mated overhead rotor may enable fine tuning of offsetting torque and this could eliminate the need for cross-shafting while still affording twin engine safety.

Additionally, according to another embodiment, the propulsion pods could swivel upwards and downwards, and may in addition be configured to swivel inwards and outwards in relation to the fuselage 8. These functions may require only limited travel to be effective, i.e., tilting upwards during hover and transitioning to parallel the fuselage for high speeds, but retaining their tilting options at all speeds for yaw control, pitch control of the whole craft, and pitch starboard relative to port. These functions and configurations may be advantageous in making much more coordinated turn-and-bank maneuvers, particularly when loading is near CG limits and where pendulum effects may be at a maximum.

According to further embodiments, these propulsion pods may be located on stub wings that droop in anhedral configuration for hover, and thus may minimize downwash interference and also enhance recirculation prevention, especially for high-hot VTOL operations and when hovering near a pinnacle, as such operations usually present a challenge for conventional helicopters in such environments. In another configuration, i.e., fixed wing high speed flights, the stub wings and pods may be flattened or even present a slight dihedral for stability enhancement.

Additional advantages that may be found with such embodiments are that the pods may be slightly swiveled inwards or outwards, for instance when in their vertical position, for slope operational stability and also for, again, combating recirculation problems when operating in other challenging environments, such as between two sheer walls, where recirculation could otherwise prohibit lifting off at all or worse, the inevitable settling with power situation. When in their horizontal position, they may prove advantageous for trimming purposes in high-speed flights if necessary, and may thus eliminate other drag-inducing surfaces. Such side pod thrusters may also be in the form of small turbofans, ducted units or even bleed air duct-thrust-compounding thrusters, with no moving parts other than the swiveling mechanisms if simplicity is desirable, and according to further embodiments.

According to another embodiment, the individual rotor blades connected to a composite hub 12 or 13 may be constructed of two or more telescoping components that may present certain advantages for in-flight transition from VTOL to fixed wing aircraft flight modes, as even as little as the addition of one telescoping section may provide a large advantage in the process of transition of load to the swing-wings, as well as for rotor blade slowing and stowing phases. With such an embodiment, in addition to allowing more compact storage areas on the fuselage or wings for the rotor blades, the rotor blade folding and stowage process could take advantage of conservation of energy and could help offset the huge gyroscopic forces associated with the rotor inertia, as well as the inertia component itself in each rotor blade, while perhaps significantly reducing aerodynamic loads during the overlapping process where the blades are potentially unbalanced for each rotor head. The in-flight mode transition may thus include telescoping/collapsing the rotor blades as the lift load is transferred to the wings—such reduction in diameter would naturally increase rotor rpm but not necessarily beyond supersonic tip speeds given the reduction in tip travel distance. A subsequent step may be to slow the rotor speed down and then allow the driven rotors to stop in full aft position relative to the fuselage 8, allowing the non-driven rotors to catch up and also stop aft, followed by the fairing 11 raising and folding to cover them similar to the way a main gear door folds to close over a wheel well opening for retractable landing gear. In that way, the engines, rotor heads and rotor shafts may all be stationary with the lightweight cover doors doing the moving for stowage purposes. Transition to slow speed VTOL mode while re-loading the rotors to take the bulk of the lifting forces may be a reverse procedure to the above for collapsing and stowing the rotor blades. The forces for telescoping the rotor sections may either be in the form of an internal band which may pull the outboard rotor section(s) towards the rotor hub portion to which the rotor blade is connected, or alternatively by the use of driving gas pressure to the overlap space between telescopic sections, which when expanded, will tend to collapse or telescope the rotor blades inwards to a reduced diameter for lift load transition between flight modes and for rotor blade stowage. According to still further embodiments, such telescoping rotor blades may be captured by extending the upper fuselage of FIG. 1 forward and then stopping the blades parallel to such an extended upper-fuselage fairing fore and aft, followed by stowing the rotor blades in unfolded configuration, with or without telescoping them first as part of the rotor blade stowage process.

According to one embodiment, the swing-wings 34 may be configured to sweep forward, and in combination with coaxial counter-rotating rotors with three blades per rotor, such wings may be swung out forward in relation to the fuselage 8 to meet up with four of the six rotor blades (three mounted on each of the coax rotor heads). The first phase of an in-flight transition from VTOL to fixed wing flight mode may be swinging the port and starboard wings 34 forward to unload the rotor blades, followed by raising the wings up to nest four of the six rotor blades with the remaining two stowed in the aft fuselage fairing.

According to another embodiment, assuming three-bladed counter-rotating, coaxial rotor pairs, the rotors for both sets could be halted in position where the aft rotor of each pair of counter-rotating, coaxial rotor sets is aligned with the fuselage (and airflow while in high speed forward flight) while the two remaining rotors are then swiveled back to an optimal sweep back position to act as stable, fixed airfoils to augment fixed-wing lift or to stand-alone as the main lifting surfaces during high speed flight. In this case, the leading edges of the halted, now optimally swept airfoils nee rotor blades remain leading edges during fixed configuration for high-speed flights. In this configuration, they may be swiveled at their roots a la "full-flying" operation and optionally, advantageously retaining the control elements used for cyclic and collective functioning while in rotation to change the pitch for fixed mode control. Alternatively, they may also have surfaces such as flaps, ailerons and flaperons for control.

According to further embodiments, following on the above, the rotors that are stopped and optimally swept could also be hinged at a distance from their roots, such that they may be of shorter, stiffer chord, with the outboard sections either hinged all the way to contact, nest or near contact with the root sections or they may be hinged to the point where they make contact with the fuselage forming a rigid, high-strength "A" section together with the fuselage on each side. Any negative impact of the fact that trailing edges are now leading edges on (only) the trailing portions of the "A" sections may be minimized by their cross-section, which tends to be flatter and often symmetrical or nearly so, in many existing rotorcraft designs already. In any case, these flatter sections could be independently movable to act as pitch controls as well, with or without root section mobility.

According to another embodiment, the swing-wings 34 may be swiveled vertically instead of swinging to stow within the fuselage 8 or deploy outside of the fuselage. This may allow the rotors to be stowed in such swing-wings and may even be configured to complete the upper surfaces of wings that are fixed out each side of the fuselage. Such vertically swiveling wings may thus angle upwards in pitch during hover and level out as forward flight speed is increased, thus minimizing interference with rotor wash during hover and other VTOL flight operations.

According to still further embodiments, the wings of a hybrid aircraft 10 may present a horizontal X-configuration, which may have both forward sweep and back sweep fixed or swing-wings at for example 45-degree angles upon which the 4-rotor blade configuration illustrated in various figures above may be stowed without a need for rotor hub/blade folding prior to flight mode transition from VTOL to fixed wing flight modes. Such wings may also be configured to pitch to vertical for hover/VTOL mode and could also incorporate the landing gear at the tips in large winglets that droop in relation to the ground, and then swivel to horizontal for transition to high speed flight with the drooping winglets now being configured as effective winglets for efficiency, according to one embodiment.

According to one embodiment, the hybrid aircraft 10 may be configured with Anton Flettner intermeshing but composite rotors in place of coaxial counter-rotating rotors as previously described herein. Such intermeshing rotors must of necessity be in constant synchronicity with each other in relation to their individual rotation, and thus a method for feathering/stowing the driven and non-driven rotor blades may be accomplished in the same manner as previously described above. Additionally, according to embodiments, such intermeshing rotors may be configured to be side-by-side in relation to the fuselage or fore and aft of each other, along the longitudinal axis of the fuselage of a hybrid aircraft 10. In the latter configuration loading and unloading of passengers could happen at the sides instead of at the front and rear, as in usual intermeshing rotorcraft, and may also enable stowing of the rotor blades to be a relatively simple and streamlined operation. According to one embodiment, wherein the intermeshing rotor hubs are side by side in configuration, a vertical X-wing swing-wing pattern, (presenting a flat and subsequently an "X" shape when viewed from the rear of the fuselage, for example) may also be incorporated into the fuselage of a hybrid aircraft 10. In such embodiment, the inboard rotor would store in the opposite side upper X-wing and the outboard rotor blade would stow in the same side (lower X-wing) and vice versa, given that intermeshing rotors outboard rotor blades are typically configured to be slanting ground-wards and the inboard intermeshing rotor blades tilt towards the sky. There would be a need to completely stop the blades from rotating prior to splitting the wings into their upper and lower X-configuration in such an embodiment.

According to embodiments, an individual rotor blade may be asymmetrical in length on either side of the rotor hub to which it is affixed or in relation to other rotor blades on the same hub, for instance for a given rotor hub to have two short and one long blades or one short fat/wide blade and one long thin one on the same hub, which may be advantageous in simplifying folding from an aerodynamic standpoint, and wherein a first phase may be to stop the long blade in aft position relative to the fuselage 8 of a hybrid aircraft 10, then fold the one or two short stub rotors aft in a next phase followed by stowage of the folded blades as described by one of the methods previously. According to further embodiments, rotor blades may also present features such as dog tooth tips, leading edge slats, winglets or other features. In one embodiment, the addition of small winglets at the tips of the rotor blades that could swivel to align with rotational flows in hover and then would gradually be swiveled to progressive positions to force the rotors to slow and finally stop once aligned in the desired position(s) with the fairing (s) may be advantageous. Such a configuration could significantly lessen the need for heavy slowing equipment like brakes and shock absorbing equipment to slow the rotor blades in anticipation for folding and stowing operations. Also, such a configuration could include small rollers near the rotor tips and corresponding ramps in case there happens to be a lot of turbulence that might otherwise damage the tips in transition to stowage. Alternatively, the rollers could be located in the stowage area on the fuselage or wings rather than at the rotor tips, in which case the tips of the rotors could contact the soft rollers once close to such stowage area(s).

It is to be understood that any of the method descriptions herein are but exemplary methodologies and that one or more of the steps described above may be omitted, while other steps may be added thereto to any of these embodiments, depending on the mission configuration intended for specific embodiments. Other operator method embodiments and device embodiments are supported as well. The order of some of the steps described herein may additionally be changed, according to any desired procedure or mode of operation.

It is also to be understood that any dimensions or descriptions referred to or illustrated herein are exemplary in nature only. Those of skill in this art will recognize that other dimensions and/or configurations may be implemented, depending upon the application, and that the elements of the device could be of any length or dimension, all of which are considered within the scope of this disclosure. Furthermore, any discussion of dimensions or ranges of dimensions or physical or dynamic aspects such as flow rates or ranges of motion or time factors or embodiment configurations outlined herein are exemplary in nature only and should not be considered to be limiting.

While certain embodiments of the disclosure have been described, these embodiments have been presented by way of example only, and are not intended to limit the scope of the disclosure. Indeed, the novel methods, devices and systems described herein may be embodied in a variety of other forms and other applications. All such other applications making use of the principles disclosed herein for this device and that could be envisioned by one skilled in the art are therefore considered to be within the scope of this disclosure. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures and dimensions thereof may differ from those shown in the figures. Depending on the embodiment, certain steps described in the examples above may be removed while others may be added. Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method, comprising:
providing an aircraft comprising counter-rotating and co-axially-disposed blades and at least one wing, the aircraft further comprising a lower swashplate coupled to pitch controls and an upper swashplate, controlled by the lower swashplate, attached to leading and trailing blade root edges of the co-axially-disposed blades;
rotating the blades;
flying the aircraft in a first configuration in which the rotating blades provide most of the lift to enable the aircraft to take off or to support the aircraft in sustained flight;
controlling pitch of the co-axially-disposed blades by acting on the leading and trailing blade root edges of the co-axially-disposed blades through the pitch controls;
during sustained flight, causing the blades to cease rotation and to at least partially overlap each other;
continuing to fly the aircraft in a second configuration in which the at least one wing provides most of the lift to support the aircraft in sustained flight.

2. The method of claim 1, further comprising stowing the at least partially overlapped blades during flight of the aircraft.

3. The method of claim 1, wherein causing comprises deploying the at least one wing from a first wing configuration to a second wing configuration.

4. A method, comprising:
providing an aircraft comprising counter-rotating and co-axially-disposed blade sets and at least one wing, the aircraft further comprising, for each blade set, a driven blade portion and a non-driven blade portion, a rotor hub comprising a driven hub portion coupled to the driven blade portion and a non-driven hub portion coupled to the non-driven blade portion;
flying the aircraft in a first configuration in which the at least one wing provides most or all of the lift necessary to support the aircraft in stable flight and in which, for each blade set, the driven hub portion is caused to rotate relative to the non-driven hub portion to cause the driven blade portion and the non-driven blade portion to at least partially overlap such that they do not provide substantial lift; and
during flight, deploying each blade set by rotating the driven hub portion relative to the non-driven hub portion to cause the non-driven blade portion to rotate to a position that is opposite the driven blade portion in a fully deployed position to reconfigure the aircraft in a second configuration in which the deployed blades sets provide most or all of the lift necessary to maintain the aircraft in sustained flight.

5. The method of claim 4, further comprising taking off with the aircraft in the first configuration.

6. The method of claim 4, further comprising taking off with the aircraft in the second configuration and, during flight, reconfiguring the aircraft to the first configuration.

7. The method of claim 4, further comprising reconfiguring the at least one wing from a first wing configuration to a second wing configuration at least during or after reconfiguring the aircraft in the second configuration.

\* \* \* \* \*